H. W. McALLISTER.
Improvement in Electric Advertising Cabinet.
No. 115,494. Patented May 30, 1871.
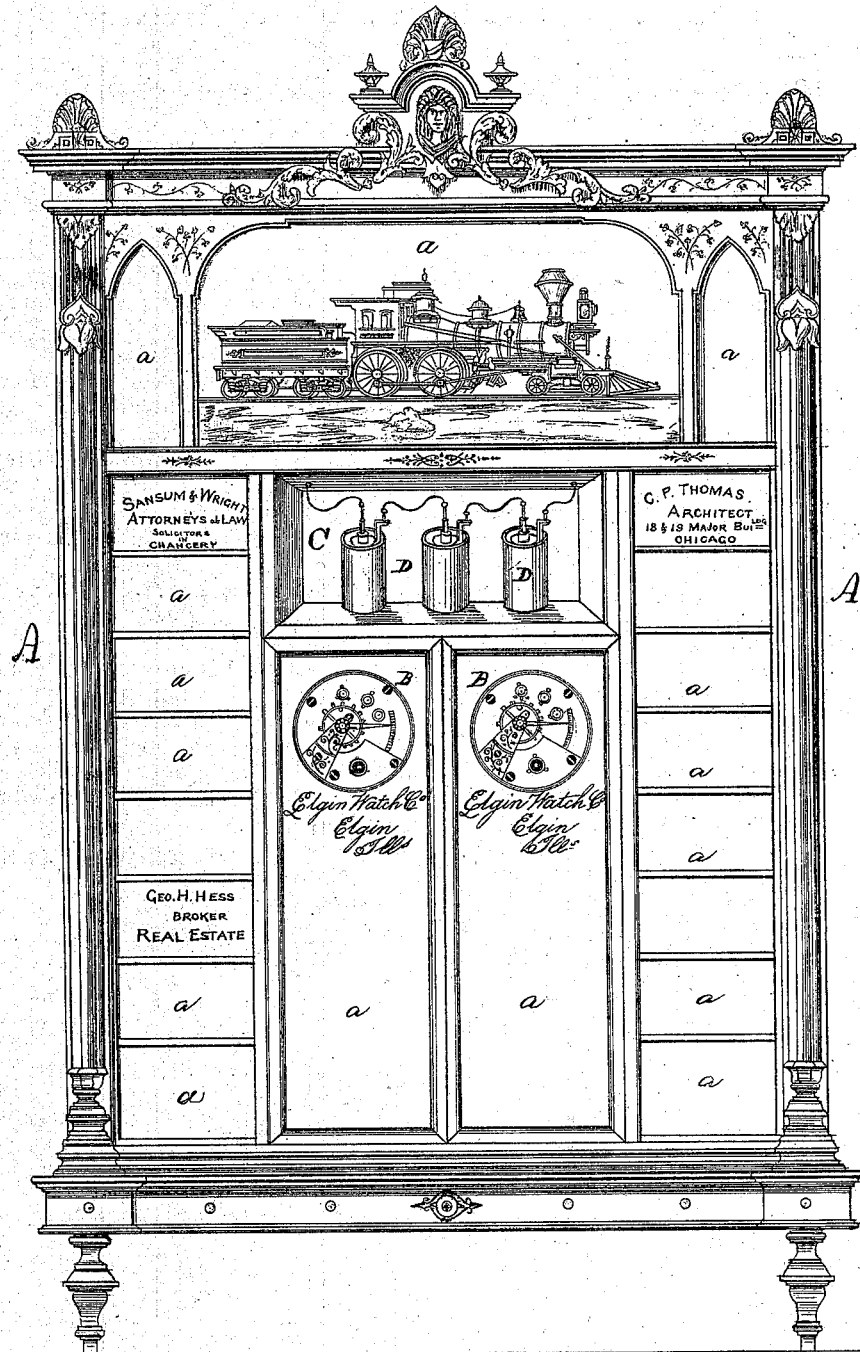

UNITED STATES PATENT OFFICE.

HARRY W. McALLISTER, OF CHICAGO, ILLINOIS.

IMPROVEMENT IN ELECTRIC ADVERTISING-CABINET.

Specification forming part of Letters Patent No. 115,494, dated May 30, 1871.

I, HARRY W. McALLISTER, of the city of Chicago, in the county of Cook and State of Illinois, have invented a certain new and useful Electric Advertising-Cabinet, of which the following is a full description, reference being had to the accompanying drawing making a part of this specification, in which there is a front elevation of my cabinet with the battery exposed to view.

The object of my invention is to construct an advertising-cabinet in which mechanisms can be exposed to view, running by electricity, to be used in suitable public places.

In the drawing, A represents a cabinet of any suitable size and form. As represented it is about ten feet high and six feet wide, and may be about fifteen inches deep, and access is had to the interior through doors in the sides or front, or both. The face of the cabinet is divided into a number of compartments or spaces, a, for the reception of advertisements, and the whole interior may be correspondingly divided by suitable partitions. Some of the advertisements may be of the usual kind; others are to be some mechanism which can be operated. B represents one plate and the balance-wheel of a watch, the wheel being connected with the battery. In the compartment C is an electrical battery, D, from which wires extend to magnets so arranged as to operate the mechanisms in the cabinet. This is done in the well-known manner, and need not be described.

The wheels and some other parts of the locomotive shown are movable and operated by the battery.

The space occupied by the battery is to be closed by a door, which is not shown.

The cabinet with its moving mechanisms forms an attractive piece of furniture and a valuable advertising-medium.

The form, size, and arrangement of the spaces for advertisements may be varied as circumstances require.

What I claim as new is as follows:

The cabinet A, when provided with advertising-spaces a, in combination with an electrical battery, D, so constructed and arranged as to be adapted to operate advertising mechanisms within said cabinet, substantially as specified.

H. W. McALLISTER.

Witnesses:
  E. A. WEST,
  O. W. BOND.